United States Patent [19]
Adam

[11] 3,815,761
[45] June 11, 1974

[54] GRIP ACCESSORY FOR REMOTE-CONTROL MANIPULATOR TONGS

[75] Inventor: Milton F. Adam, Idaho Falls, Idaho

[73] Assignee: The United States of America as represented by the United States Atomic Energy Commission, Washington, D.C.

[22] Filed: Mar. 2, 1973

[21] Appl. No.: 337,324

[52] U.S. Cl. .......................................... 214/1 CM
[51] Int. Cl. ............................................... B25j 3/00
[58] Field of Search ................................ 214/1 CM

[56] References Cited
UNITED STATES PATENTS
3,428,189   2/1969   Ainsworth ..................... 214/1 CM Primary Examiner—Robert G. Sheridan
Assistant Examiner—George F. Abraham
Attorney, Agent, or Firm—John A. Horan; Arthur A. Churm; Hugh W. Glenn

[57] ABSTRACT

A master-slave manipulator includes an activator handle and tong assembly interconnected by mechanical transmission elements for imparting the movement of the handle to the tongs. A supplementary power unit is mounted on the tong assembly to provide a controlled tong grip when engaged, but is capable of being disengaged to permit unimpeded operation of the tongs from the activator handle.

8 Claims, 6 Drawing Figures

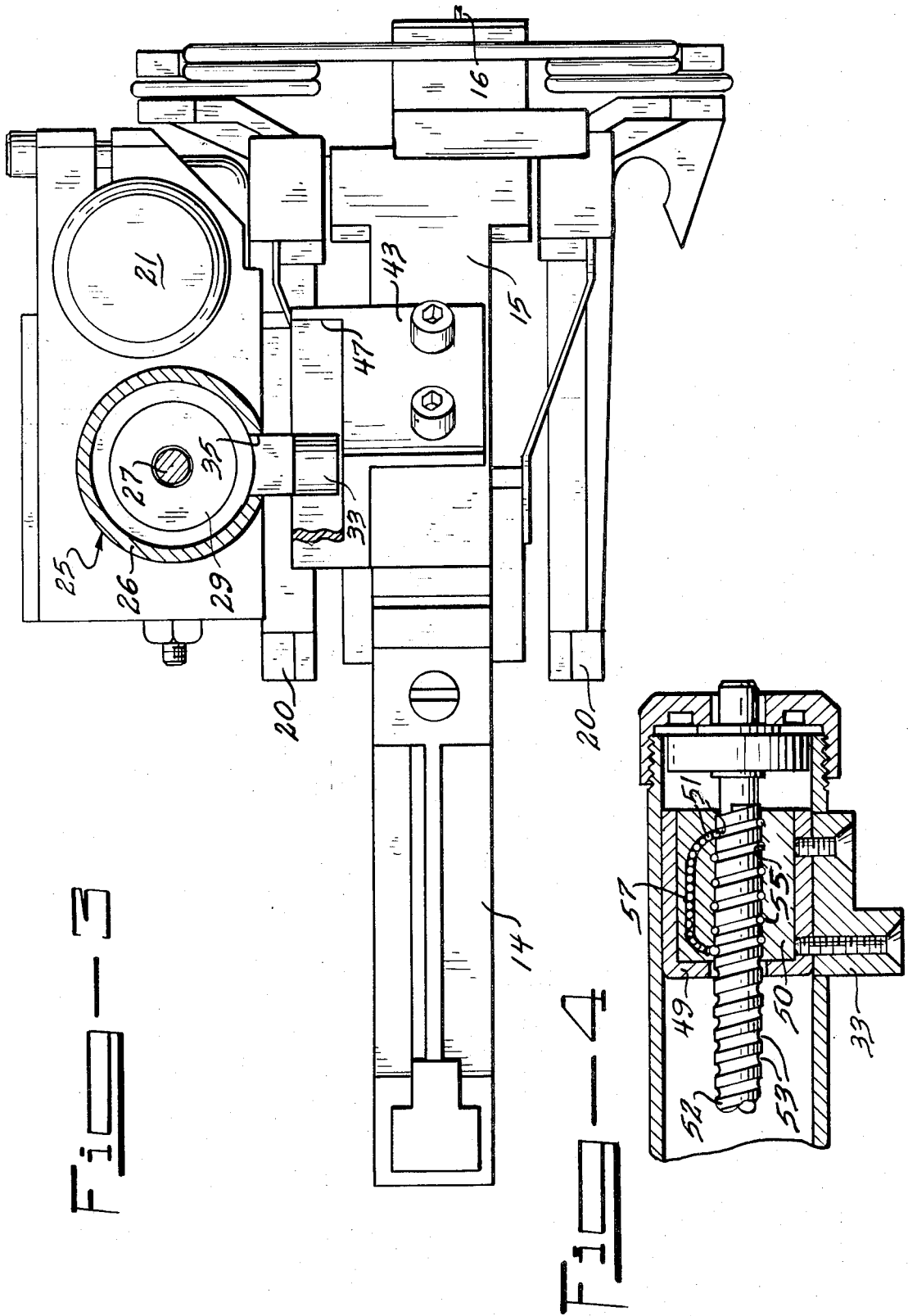

3,815,761

GRIP ACCESSORY FOR REMOTE-CONTROL MANIPULATOR TONGS

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

Master-slave or remote-control manipulators are used for handling radioactive materal, toxic material or other dangerous substances by an operator located behind a protective wall. The manipulator includes a control module or activator handle that is accessible to the operator, and linking portions such as cables, tapes and miniature guide components that pass to the opposite side of the wall to a tong assembly or other tool. Manipulators of this type are illustrated and described in detail in U.S. Pat. No. 2,695,715 to R. C. Goertz et al., Nov. 30, 1954; and U.S. Pat. No. 2,771,199 to D. G. Jelatis, Nov. 20, 1956 both of which are assigned to the U.S. Atomic Energy Commission.

In employing a remote-control manipulator, it is most important that a sufficient but not excessive grip-force be applied to firmly hold the object. The amount of grip-force that can be safely applied to the tongs of a conventional manipulator has been limited by the strength of the cable, other connecting components and the geometry of the linkage. Failures of these and other components of the system have resulted in objects being inadvertently dropped and damaged. It is particularly important that this be avoided in handling fuel elements or test capsules that have been removed from a nuclear facility. Dropping of these objects not only could damage the cladding but also could interject uncertainty in results subsequently obtained from examination of materials within test capsules. Often such capsules have been irradiated within a reactor for several months and an in-cell accident may require that the experiment be repeated to substantiate the findings.

In addition, damage to the object can also result from careless or unskillful operation of the manipulator. It is often difficult to judge the exact amount of force required to lift an object without crushing or penetrating a protective layer. Operators generally require considerable practice before they become adept at using an unfamiliar manipulator. In handling heavy objects such as fuel elements or test capsules, some type of force amplification is generally incorporated into the mechanism, thus making it even more delicate and sensitive to the operator's touch. Consequently, there is considerable potential for accidents with resulting damage when conventional manipulator devices are used.

SUMMARY OF THE INVENTION

Therefore in view of the limitations of the prior art, it is an object of the present invention to provide an improved master-slave manipulator that imparts a controlled grip-force to the manipulator tongs.

It is a further object of this invention to provide supplementary power for firm grip-support of objects handled within a shielded cell.

It is another object to provide such a master-slave manipulator that can also be readily operated in the normal mode.

It is also an object to provide an improved manipulator tong assembly that is locked against externally applied forces.

These and other objects of the present invention are accomplished within a master-slave manipulator having an accessible activator handle interconnected to a remote tong assembly by the addition of a power-assist unit to the tong assembly. The power-assist unit includes a pair of powered reciprocable fingers that converge and diverge in alignment. The fingers converge into engagement with bearing surfaces on linkages of the tong assembly to impart controlled converging forces to the tong jaws. On diverging, the fingers move from engagement with the bearing surfaces to permit the usual operation of the manipulator.

BRIEF DESCRIPTION OF THE DRAWINGS

The present invention is illustrated in the accompanying drawings wherein

FIG. 3 is a side view, partly in section, of the tong assembly shown in FIG. 2.

FIG. 4 is a fragmentary view in section of the tong assembly shown in FIG. 2.

DETAILED DESCRIPTION

Figure 1:
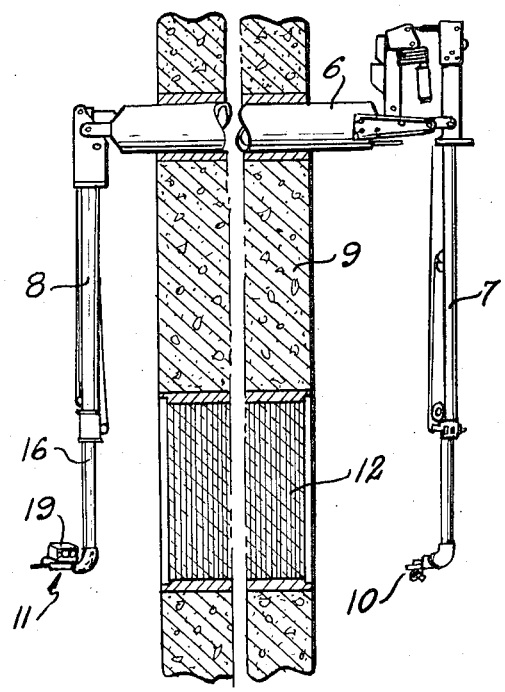
FIG. 1 is an elevation view partly in section of a master-slave manipulator mounted in a shielding wall.

As shown in FIG. 1, a master-slave manipulator includes a master arm 7 having a control module or handle 10 and a slave arm 8 equipped with a tong assembly 11. Assembly 11 is removably coupled to slave arm 8 and functions there much in the same manner as a hand on a wrist. The master and slave arms are interconnected by a horizontal support 6 that penetrates a wall 9 constructed of shielding material. The material and thickness of the wall will be sufficient to accomplish the shielding purpose required, such as the shielding of an operator stationed at the master arm from radioactive material or bacteria at the slave arm side of the wall. The wall includes a viewing window 12 of laminated glass to facilitate operation of the manipulator.

The manipulator includes various mechanical transmission elements such as tapes, cables, guides and pivots that interconnect the master arm 7 with the slave arm 8 and thereby transmit the motion applied at the handle 10 to the tong assembly 11. These transmission elements along with their operation are well illustrated in the above-cited patents and therefore will not be described in detail. In general, while referring to both Figures 1 and 2, the motion applied at the handle 10 is imparted to the tong jaws 14 of assembly 11 by the action of one or more tapes or cables 16 connected through various guides and pivots to two parallelogram linkages indicated at 15. As the cable is retracted the tong jaws 14 are thereby made to close or converge into contact with the object to be grasped. When the tension on the cable is removed the tongs are returned to the open or diverged position by biasing springs hidden within the parallelogram linkages 15.

Figure 2A:
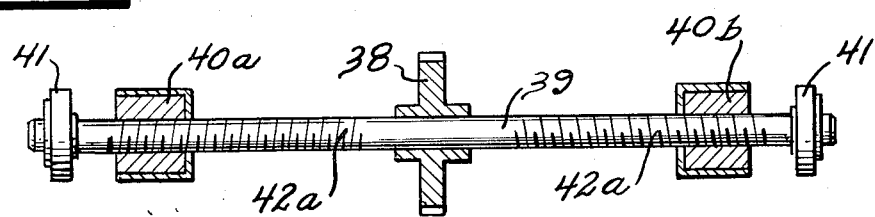
FIG. 2a is a fragmentary view showing an alternate embodiment of the FIG. 2 tong assembly.
Figure 2:
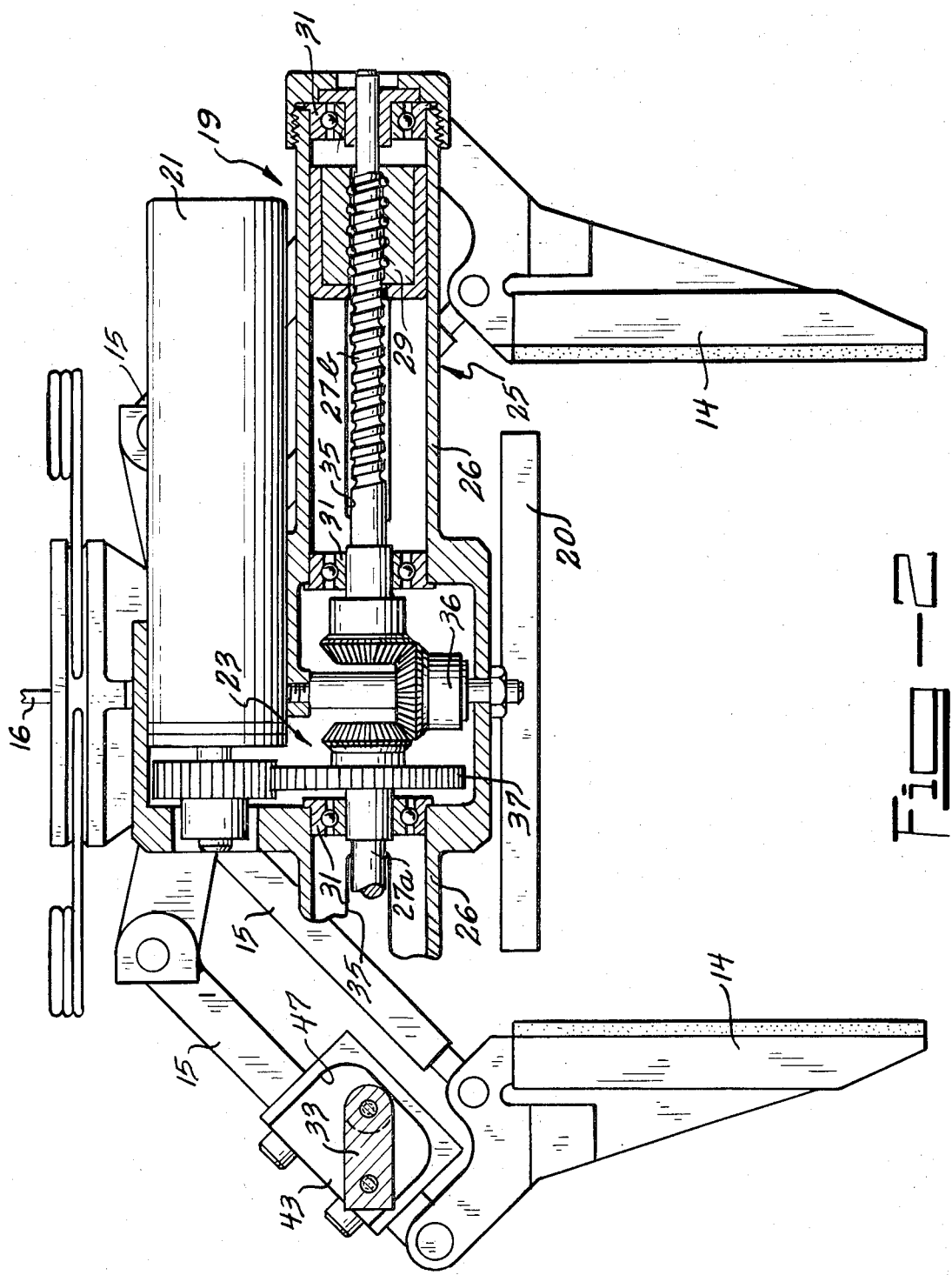
FIG. 2 is a plan view partly in section and partly cut away showing a remotely controlled tong assembly.

In addition to the conventional master-slave manipulator, as thus far described, FIGS. 1 and 2 also show a power-assist unit 19 mounted on the tong assembly 11. The power-assist unit includes an electric gearmotor 21 interconnected through a gear train 23 to a tong drive assembly 25 that transmits linear converging force and motion through parallelogram linkages 15 to the tong jaws 14.

The tong drive assembly 25 as shown in FIGS. 2 and 3 is contained within a housing 26 internally fitted with axial bearings 31 at the housing center and end portions. Two shafts 27a and 27b, threaded or cut with helical grooves, are rotatably supported in axial alignment within bearings 31. Two nut members diverging each having an internally cut helical groove be threads rotatably receive shafts 27a and 27b to achieve linear motion as the shafts are rotated. The nut members 29 are rotatably anchored by extended finger portions 33 which project through elongated slots 35 within housing 26.

Each of the two shafts 27a and 27b are made to rotate in opposite directions to give either a converging or dverging movement to nut members 29. This can b accomplished as shown by coupling gearmotor 21 to a spur gear 37 that is fixedly mounted on the end of shaft 27a. Three intermeshed miter gears 36 transmit and reverse the direction of rotation to the other shaft member 27b.

An alternate manner of achieving the converging and diverging motion of the nut members is illustrated in FIG. 2a. A single shaft 39 is supported lengthwise between bearings 41 in the tong drive assembly and is rotatably received at opposite end portions into each of two nut members 40a and 40b. However, the spiral grooves 42a at one end portion of shaft 39 are cut in the opposite direction to the grooves 42b at the opposite end portion of the shaft. The corresponding internal grooves within the two nut members 40a and 40b are likewise threaded in opposite directions to matingly engage shaft 39 at the opposite end portions. Accordingly, as shaft 39 is rotated at spur gear 38, the two nut members 40a and 40b will either converge or diverge depending on the direction of rotation.

Returning now to FIGS. 2 and 3 where an offset or generally Z-shaped bracket member 43 is shown bolted to the outer arm of parallelogram linkage 15. Bracket 43 is thus attached at an outer flange thereof and its distal portion includes an open U-shaped bearing surface 47 that extends inwardly towards a similar bracket member bolted to the opposing parallelogram linkage. Since both parallelogram linkages 15 are normally disposed at an oblique angle to the travel of the nut members 29, finger portions 33 will slidingly engage the U-shaped bearing surfaces 47 as they converge to force the tongs 14 inwardly. As the fingers 33 diverge, sliding contact with bearing surface 47 is maintained as a result of the outward spring biasing of the parallelogram linkages. However, after the fingers are extended to a partially or fully diverged position, the conventional tong activator system can be employed to operate the tongs with the fingers 33 separated from the bearing surfaces 47.

Another manner of transmitting force from the tong drive assembly 25 to the tongs is to adapt fingers 33 to directly engage the outer arms of parallelogram linkages 15. This can be accomplished by slightly elongating the tong drive assembly 25 along with extending fingers 33 such that they contact the outer surfaces of the parallelogram linkages as they converge. However, the use of bracket 43 is preferred to reduce the force moment exerted on the nut members by the short fingers and to reduce the required length of the tong drive assembly.

FIG. 4 presents a detailed view of a particularly suitable tong drive assembly. Finger portions 33 are mounted onto an outer sleeve 49 that is affixed around a ball screw nut 50. Nut 50 rotatably receives a mating shaft 52. The basic ball screw nut and shaft combinations are commercially available and include a circuit of ball bearings 51 that are positioned between a helical groove 53 of the shaft 52 and an internal corresponding groove 55 within the nut member 50. A recirculation passageway 57 is provided within nut member 50 to permit the ball bearings to continuously roll along helical groove 53 as the nut proceeds along shaft 52. Ball screw assemblies of this type provide nearly friction-free operation and thereby facilitate control of the grip force transmitted through finger portions 33 to the tongs.

Gearmotor 21 is a direct-current type having a speed reduction ratio of about 100:1 to 200:1. This high gear ratio locks the tong jaws in position against externally applied forces even if a power failure should occur. A very low-powered motor, for instance about 1/400 of a horsepower, can be used to provide sufficient grip force to the tongs. Generally about 50–150 lbs. force at the tong jaws is more than adequate to firmly grip and lift fuel elements or capsules that weigh about 3 to 10 lbs. as well as other more massive objects.

Figure 5:
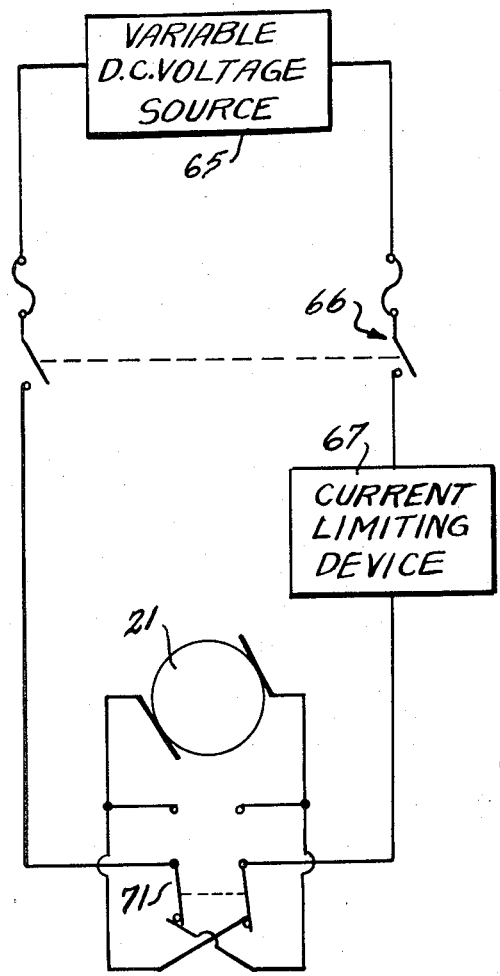
FIG. 5 is a diagrammatic drawing of a control circuit employed in operating the tong assembly of FIG. 2.

FIG. 5 shows one manner in which electrical connections can be made to control gearmotor 21. Ordinarily a small motor of this type will have a permanent magnet for the field and a commutator-connected armature coil. A proportional relationship of torque to armature current is thereby established. Alternatively, field coils could be connected in parallel with the armature to provide a constant field with proportional current to torque relation. Power is supplied to motor 21 by a commercially-available, variable d.c. voltage source 65 through suitable switch gear devices 66. The motor speed is controlled by the variable voltage source 65.

A current limiting device 67 is connected in series with motor 21 to limit the motor torque and thereby limit the grip force exerted by the tong jaws. Device 67 can be a commercially available unit or constructed of commercially-available components by one skilled in the electrical arts. One such current limiting unit includes a transistor having a variable resistor and Zener diode connected in series between the emitter and base. The unit is connected in series with the motor 21 with the collector connected to the motor, and one side of the power supply connected between the variable resistor and the Zener diode. The other side of the power supply is connected through an appropriately sized resistor to the transistor base. This type of current limiting device will permit the armature current to approach and be maintained just below a preset level to limit the motor torque. Alternatively, a circuit breaker type current limiting device can be used to interrupt the armature current in the event it exceeds a preset level. Where a circuit breaker is employed, the motor gearhead will provide a lock to maintain the tong grip.

A double pole-double throw switch 71 is provided to connect the armature of motor 21 with the variable voltage source 65 and the current limiting device 67. By throwing switch 71 from one to the other of its two "on" positions, the rotation of motor 21 is reversed and the nut members made to converge or diverge as desired.

In employing the tongs of the present invention, a fuel element or other object is positioned between the opened tong jaws 14 with beam 20 (FIG. 1) protecting the operating components from impact with the object. The tong jaws are then closed through use of the conventional activator handle and transmission elements until they contact the object on both sides. The gearmotor 21 is then energized to drive the nut members in converging directions by appropriately positioning switches 71 and 66 (FIG. 5). Finger portions 33 converge inwardly until they contact the U-shaped bearing surface 47 on bracket 43. As the motor stalls, the armature current is limited by current limiting device 67 to the proper amount to provide the desired amount of grip force to the tong jaws 14. For instances in which the armature current is interrupted, the gear reduction elements within gearmotor 21 prevent release of the grip already applied on the surfaces of the object until the motor is energized in a reverse direction to cause the nut members to diverge.

It will be clear from the foregoing discussion, that the present invention provides a power assist unit for installation on a master-slave manipulator which provides a controlled grip force to the manipulator tongs. The motor armature current is controlled to provide a sufficient amount of grip force to firmly hold the object without causing indentations or other damage. The power-assist drive system is also easily disengaged from the tongs to permit normal operation, but it is locked in position when engaged even if a power failure occurs.

The embodiments of the invention in which an exclusive property or privilege is claimed are defined as follows:

1. In a master-slave manipulator having an accessible activator handle, a remote tong assembly including oppositely facing jaws for grasping an object to be manipulated, and mechanical means interconnecting said handle and tong assembly for imparting force and movement applied at said handle to said tong assembly, the improvement comprising: power assist means attached to said remote tong assembly for imparting a controlled grip-force to said tong jaws supplementary to the force applied at said handle, said power assist means includes at least two reciprocable fingers adapted to converge and diverge in alignment, and open bearing surfaces carried by each of said tong jaws, said surfaces positioned to intersect said fingers during convergence and thereby impart controlled converging forces to said tong jaws, but positioned to release said fingers in a diverged location and thereby permit tong movement by said mechanical means.

2. The manipulator of claim 1 wherein said power assist means includes motive means for imparting linear converging and diverging forces to said fingers and locking components for preventing movement of said jaws as a result of external forces applied at said jaws.

3. The manipulator of claim 2 wherein said motive means includes a direct-current electric motor having the armature windings thereof connected across a variable d.c. voltage source and a current-limiting means connected in electrical series with said armature windings for controlling said converging forces imparted to said tong jaws, and gear reduction components interconnected between said motor mechanical output and said fingers for locking said tong jaws in respect to externally applied forces.

4. The manipulator of claim 3 wherein said gear reduction components provide a gear ratio of 100:1 to 200:1 to decrease the speed while increasing the torque output of said motor.

5. The manipulator of claim 1 wherein said power assist means includes:
   a. a housing mounted on said tong assembly and having a longitudinal slot facing said assembly;
   b. a pair of axially aligned shaft portions, having helical grooves over a substantial fraction of their length, rotatably mounted within said housing;
   c. a pair of internally grooved nut members, each rotatably receiving one of said shaft portions and each having a radially extending finger projecting through said housing slot, thereby restricting movement of said nut members with fingers to along said slot;
   d. motive means coupled to said shaft portions for imparting controlled converging and diverging forces to said fingers; and
   e. bearing means associated with said tong jaws, said bearing means aligned to receive said fingers in convergence to impart inward force to said jaws, but aligned to release said fingers in a diverged location to permit tong jaw movement by said handle and mechanical means.

6. The manipulator of claim 5 wherein pivotal parallelogram linkages support said tong jaws, and U-shaped bearings are installed on outer arms of said linkages with the open portions thereof in normally-oblique, facing alignment with said converging forces of said fingers.

7. The manipulator of claim 5 wherein there is included a recirculatable array of ball bearings within the helical grooves of said shaft portions beneath said nut members, said nut members having passageways communicating with said helical grooves at the end portions of each member for allowing said ball bearings to continuously roll along said grooves as said nut members move along said shaft.

8. The manipulator of claim 5 wherein said shaft portions are opposite end portions of a common shaft and a helical groove within each of said shaft portions being counterwound to a helical groove within the opposite shaft portion.

* * * * *